(12) United States Patent
Yasunaga

(10) Patent No.: US 10,919,022 B2
(45) Date of Patent: Feb. 16, 2021

(54) EXHAUST GAS PURIFYING AGENT FOR AUTOMOBILES AND METHOD OF PRODUCING THEREOF

(71) Applicant: EISHIN CO., LTD., Minato-ku (JP)

(72) Inventor: Chie Yasunaga, Minato-ku (JP)

(73) Assignee: EISHIN CO., LTD., Minato-ku (JP)

( * ) Notice: Subject to any disclaimer, the term of this patent is extended or adjusted under 35 U.S.C. 154(b) by 0 days.

(21) Appl. No.: 16/605,139

(22) PCT Filed: Aug. 24, 2017

(86) PCT No.: PCT/JP2017/030361
§ 371 (c)(1),
(2) Date: Oct. 14, 2019

(87) PCT Pub. No.: WO2018/211717
PCT Pub. Date: Nov. 22, 2018

(65) Prior Publication Data
US 2020/0384443 A1    Dec. 10, 2020

(30) Foreign Application Priority Data

May 16, 2017 (JP) .................................. 2017-097205

(51) Int. Cl.
| | | |
|---|---|---|
| *B01J 21/16* | (2006.01) | |
| *B01J 31/06* | (2006.01) | |
| *B01J 31/26* | (2006.01) | |
| *B01J 35/02* | (2006.01) | |
| *B01J 37/02* | (2006.01) | |
| *B01D 53/94* | (2006.01) | |
| *B01J 35/00* | (2006.01) | |

(52) U.S. Cl.
CPC .............. *B01J 21/16* (2013.01); *B01D 53/94* (2013.01); *B01J 31/061* (2013.01); *B01J 31/062* (2013.01); *B01J 31/26* (2013.01); *B01J 35/0033* (2013.01); *B01J 35/026* (2013.01); *B01J 37/0219* (2013.01); *B01D 2255/65* (2013.01); *B01D 2255/707* (2013.01)

(58) Field of Classification Search
CPC . B01J 21/16; B01J 31/061; B01J 31/26; B01J 35/0033; B01J 35/026; B01J 37/0219; B01D 53/94; B01D 2255/65; B01D 2255/707
USPC ......................................................... 502/404
See application file for complete search history.

(56) References Cited

FOREIGN PATENT DOCUMENTS

| | | |
|---|---|---|
| JP | 2000-161153 A | 6/2000 |
| JP | 2000-282977 A | 10/2000 |
| JP | 2004-68676 A | 3/2004 |
| JP | 2007-315218 A | 12/2007 |
| JP | 2008-14170 A | 1/2008 |
| JP | 2014-156853 A | 8/2014 |
| JP | 6339724 B1 | 6/2018 |

OTHER PUBLICATIONS

International Search Report dated Oct. 24, 2017 in PCT/JP2017/030361 filed Aug. 24, 2017.
Japanese Office Action dated May 1, 2019 in Japanese Patent Application No. 2017-97205 filed May 1, 2017, 4 pages.
"Energy efficiency: Filtering Technology for Combustion Efficiency and Reducing Air Pollution," United Nations Industrial Development Organization, http://www.unido.or.jp/en/technology_db/2890, Nov. 16, 2016, 6 pages.

*Primary Examiner* — Edward M Johnson
(74) *Attorney, Agent, or Firm* — Oblon, McClelland, Maier & Neustadt, L.L.P.

(57) ABSTRACT

The problem of the present invention is to provide an exhaust gas purifying agent for automobiles which is capable of improving the automobile fuel mileage as well as purifying the exhaust gas of the automobiles, and further extending the effective duration of the exhaust gas purifying agent for automobiles by a simple method of spraying the exhaust gas purifying agent for automobiles using only natural ingredients on the air filter.
The problem of the present invention can be solved by using a liquid containing a) tourmaline fine powder, b) porous material fine powder, c) fucoidan extracted from seaweeds, d) amino peptides and/or alginic acids extracted from seaweeds in water as the exhaust gas purifying agent for automobiles by spraying on the air filter of automobiles.

5 Claims, 5 Drawing Sheets

EXHAUST GAS PURIFYING AGENT FOR AUTOMOBILES AND METHOD OF PRODUCING THEREOF

TECHNICAL FIELD

The present invention relates to an exhaust gas purifying agent for automobiles, which is used by being sprayed on an air filter of automobiles, a method of producing the exhaust gas purifying agent, and a method of using the same.

BACKGROUND ART

In recent years, since air pollution and global warming phenomenon due to an exhaust gas of automobiles, crude oil shortage due to exhaustion of petroleum, and the like are worldwide issues, purification of exhaust gas of automobiles and improvement of automobile fuel mileage have become important problems.

As a method for improving an automobile fuel mileage by a simple and economical means without changing an engine, the structure of an electric system and the like, and oils such as fuel, lubricant, it is disclosed that a modification is added to the air taken into the engine.

In Patent Documents 1 and 2, it is disclosed that electrons (negative ions) of high-tension capacity are loaded into an engine intake air duct with a discharge needle for ion activation of the intake air, thereby, ultra atomization bonding and mixed gasification with gasoline, diesel oil or the like in the carburetor and cylinder is promoted to increase a horsepower, to improve a fuel mileage, and to reduce exhaust gas pollution. However, in this method, a high voltage generator is expensive, and there is a concern that it will adversely affect the electronic devices of automobiles.

In addition, Patent Documents 3 and 4 disclose that a package containing activated carbon or the like is provided in an intake device of an internal combustion engine so as to increase a combustion efficiency. However, in this method, it takes time and effort to attach, detach and replace the package in the air filter box.

Moreover, in Patent Document 5, the inventors of the present invention previously proposed to improve an automobile fuel mileage by spraying a fuel mileage improving liquid containing amino peptides and alginic acids extracted by boiling down fish and shellfish and seaweeds with water immersing in tourmaline, black silica or green glitter which is capable of generating negative ions on the air filter. However, in recent years, it has been required to further purify the exhaust gas as well as to improve the fuel mileage.

PRIOR ART DOCUMENTS

Patent Documents

Patent Document 1: JP 2000-161153 A
Patent Document 2: JP 2000-282977 A
Patent Document 3: JP 2004-068676 A
Patent Document 4: JP 2008-14170 A
Patent Document 5: JP 2014-156853 A

SUMMARY OF INVENTION

Problems to be Solved by the Invention

The inventors of the present invention have earnestly studied and achieved the invention to further improve the performance of purifying the exhaust gas in the fuel mileage improving liquid of Patent Document 5 previously proposed using only natural ingredients. The problem of the present invention is to provide an exhaust gas purifying agent for automobiles which is capable of improving the automobile fuel mileage and improving purification performance of the automobile exhaust gas further by substantially reducing the emission amount of nitrogen oxide (NOx) and carbon dioxide ($CO_2$) as well as the emission amount of carbon monoxide (CO) and hydrocarbon (HC) in the exhaust gas, and further uniformly adhering and securely fixing tourmaline fine powder and porous material fine powder to an air filter to extend the effective duration of the exhaust gas purifying agent for automobiles by a simple method of spraying the exhaust gas purifying agent for automobiles using only natural ingredients, a method of producing the exhaust gas purifying agent, and a method of using the exhaust gas purifying agent.

Means for Solving the Problems

The above problem of the present invention is solved by an exhaust gas purifying agent for automobiles in which a) tourmaline fine powder, b) porous material fine powder, c) fucoidan extracted from seaweeds, d) amino peptides and/or alginic acids extracted from seaweeds are contained in water as an exhaust gas purifying agent for automobiles used by spraying on an air filter of automobiles, a method of producing the exhaust gas purifying agent, and a method of using the exhaust gas purifying agent.

The summary of the present invention is as follows:

(1) An exhaust gas purifying agent for automobiles used by spraying on an air filter, wherein
   a) tourmaline fine powder,
   b) porous material fine powder,
   c) fucoidan extracted from seaweeds, and
   d) amino peptides and/or alginic acids extracted from seaweeds
   are contained in water.

(2) The exhaust gas purifying agent for automobiles according to (1), wherein
   e) plant essential oils such as cypress oil, hiba oil and the like acting as a natural preservative are further contained.

(3) A method of producing the exhaust gas purifying agent for automobiles according to the above (1), the method including:
   1) a step of dispersing tourmaline fine powder and porous material fine powder in water, and
   2) a step of adding fucoidan extracted from seaweeds and amino peptides and/or alginic acids extracted from seaweeds to the liquid obtained in the above 1).

(4) A method of producing the exhaust gas purifying agent for automobiles according to the above (2), the method including:
   1) a step of dispersing tourmaline fine powder and porous material fine powder in water, and
   2) a step of adding fucoidan extracted from seaweeds and amino peptides and/or alginic acids extracted from seaweeds, and plant essential oils such as cypress oil, hiba oil and the like acting as a natural preservative to the liquid obtained in the 1).

(5) A method of using the exhaust gas purifying agent for automobiles according to the above (1) or (2), the method including:
   1) a step of taking out an air filter from an engine room of the automobile,
   2) a step of spraying the exhaust gas purifying agent for automobiles on both sides of the air filter, and 3) a step of returning the air filter sprayed with the exhaust gas purifying agent for automobiles to the engine room.

Effects of the Invention

In the exhaust gas purifying agent for automobiles and the method of using the exhaust gas purifying agent of the present invention, it is possible to improve the automobile fuel mileage and purification performance further by substantially reducing the emission amount of nitrogen oxide (NOx) and carbon dioxide ($CO_2$) as well as the emission amount of carbon monoxide (CO) and hydrocarbon (HC) in the exhaust gas by a simple method of spraying the exhaust gas purifying agent for automobiles using only natural ingredients to the air filter. It is further possible to extend the effective duration of the exhaust gas purifying agent for automobiles by uniformly adhering and securely fixing tourmaline fine powder and porous material fine powder to the air filter.

Moreover, in a method of producing the exhaust gas purifying agent for automobiles of the present invention, it is possible to produce such an excellent exhaust gas purifying agent for automobiles economically and efficiently.

MODES FOR CARRYING OUT THE INVENTION

Figure 1:
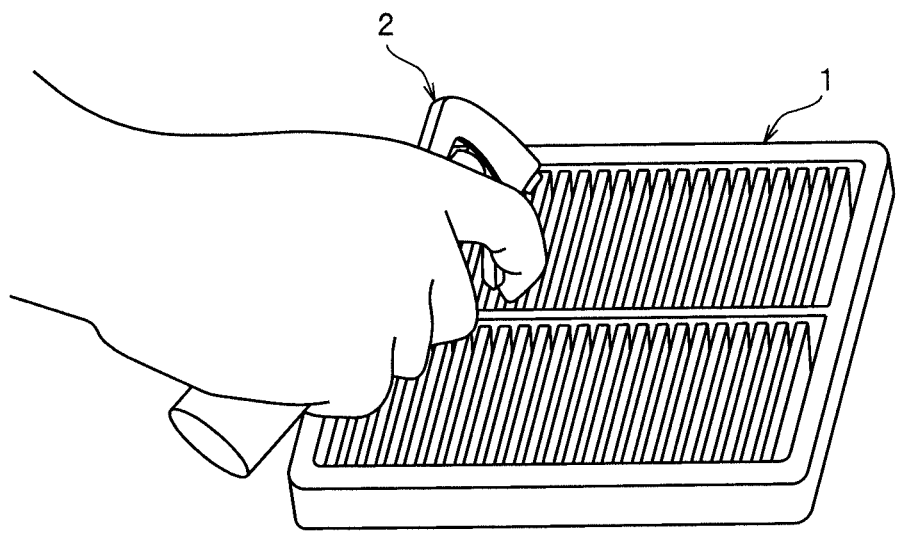
FIG. 1 is a schematic view illustrating a method of using the exhaust gas purifying agent for automobiles according to the present invention.
Figure 2:
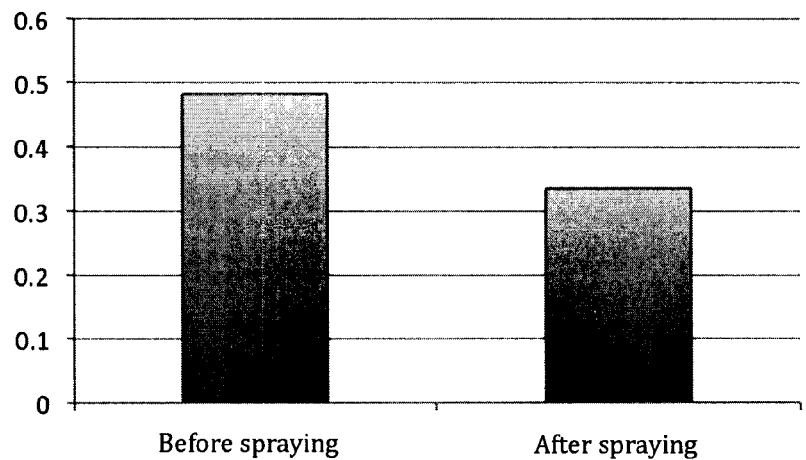
FIG. 2 shows an amount of carbon monoxide (CO) in the exhaust gas in the ten-fifteen mode running state.
Figure 3:
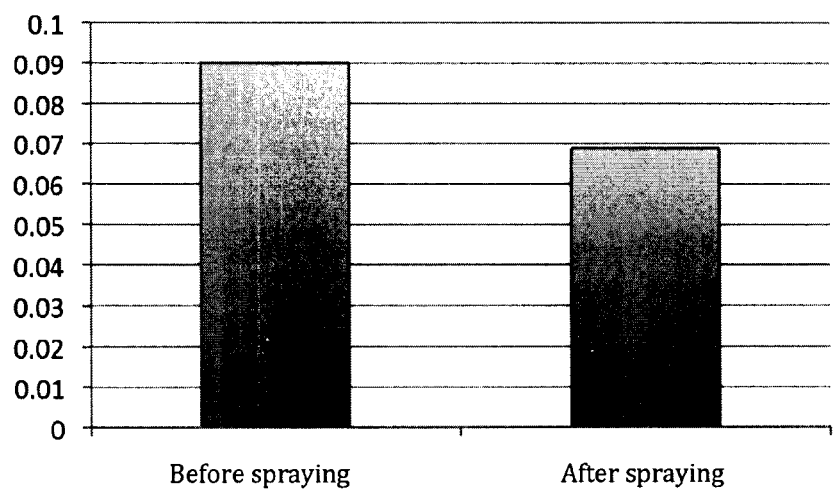
FIG. 3 shows an amount of hydrocarbon (HC in the exhaust gas in the ten-fifteen mode running state.
Figure 4:
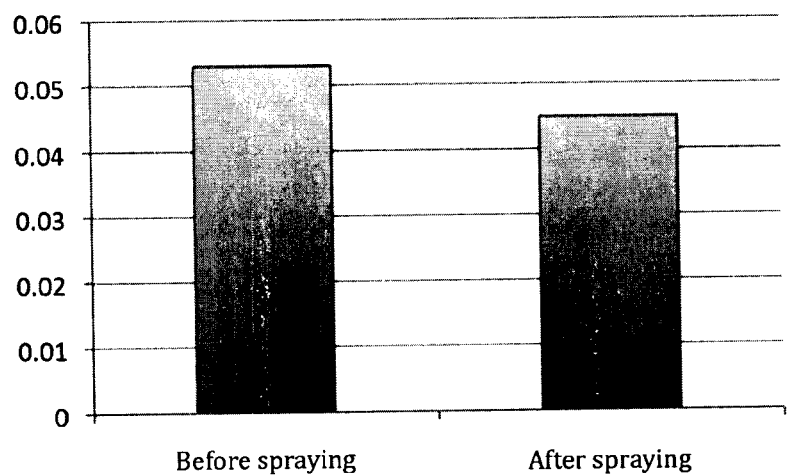
FIG. 4 shows an amount of nitrogen oxide (NOx) in the exhaust gas in the ten-fifteen mode running state.
Figure 5:
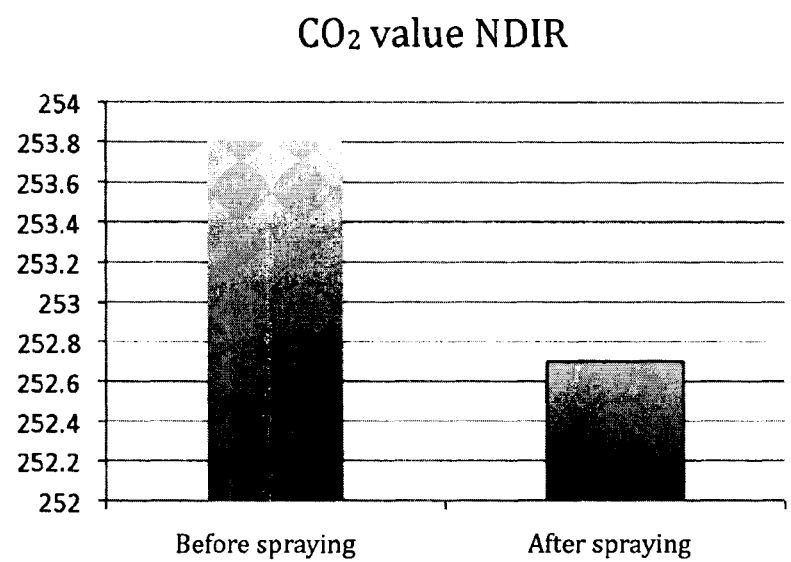
FIG. 5 shows an amount of carbon dioxide (COA in the exhaust gas in the ten-fifteen mode running state.

Hereinafter, modes for carrying out the invention will be described in detail with reference to the drawing.

It should be noted that the present invention is not limited thereto.

The exhaust gas purifying agent for automobiles of the present invention is characterized in that a) tourmaline fine powder, b) porous material fine powder, c) fucoidan extracted from seaweeds, and d) amino peptides and/or alginic acids extracted from seaweeds are contained in water. The summary has been deserved to be registered and posted on UNIDO (United Nations Industrial Development Organization) environmental technology database (http://www.unido.or.jp). Further, the exhaust gas purifying agent for automobiles of the present invention has been highly evaluated in trial tests by a number of taxi companies and transportation companies, and is extremely excellent in practical use.

First, components contained in the exhaust gas purifying agent for automobiles of the present invention will be described.

<Water>

As the water to be used for the exhaust gas purifying agent for automobiles of the present invention, there is no serious problem with tap water. However, it is preferable to use ion exchanged water excluding disinfectant including chlorine.

<Tourmaline Fine Powder>

Tourmaline is a group name of silicate minerals, and it was discovered in 1880 by Pierre Curie that tourmaline generates piezoelectricity and pyroelectricity.

When the exhaust gas purifying agent for automobiles of the present invention is sprayed on the air filter of the automobile, the tourmaline fine powder adheres and fixes to the air filter. Due to the pressure of an air passing through the air filter, a phenomenon occurs in which moisture (water vapor) in the air passing through the air filter is decomposed into hydroxyl ion ($H_3O^{2-}$) and hydrogen gas ($H_2$), thereby it is possible to combust fuel due to a purifying effect in the combustion chamber of the engine by a surfactant action of the hydroxyl ion and a combustion effect of the hydrogen gas in a state of almost complete combustion. Accordingly, it is considered to be possible to improve the automobile fuel mileage and to further improve the purification performance of the exhaust gas of the automobiles by substantially reducing the emission amount of nitrogen oxide (NOx) and carbon dioxide ($CO_2$) as well as the emission amount of carbon monoxide (CO) and hydrocarbon (HC) in the exhaust gas.

That is, the tourmaline fine powder adhered and fixed to the air filter generates piezoelectricity due to the pressure of the air passing through the air filter, and as shown in the following formula (1), water molecules ($H_2O$) contained in the air are electrically decomposed into H and OH. As shown in the following formula (2), $H^+$ is attracted to the tourmaline and released as hydrogen gas ($H_2$), while $OH^-$ is bonded to the water molecules ($H_2O$) and turns into an ion having a surfactant effect called negative hydroxyl ion ($H_3O^{2-}$).

$$2H_2O \rightarrow H_2 + 2OH^- \quad (1)$$

$$OH^- + H_2O \rightarrow H_3O^{2-} \quad (2)$$

Since the hydroxyl ion ($H_3O^{2-}$) generated by the electrolysis has a surfactant action, it is conceivable that hydroxyl ion ($H_3O^{2-}$) acts to remove stains such as soot in the combustion chamber of the engine and to improve the fuel mileage.

In addition, it is conceivable that the hydrogen gas ($H_2$) generated by the electrolysis can improve the fuel mileage by combusting itself as well as by consuming oxygen ($O_2$) by the combustion of the hydrogen gas ($H_2$), thereby preventing an increase in fuel injection amount due to a feedback control recently adopted in most of the automobiles [the control which measures the amount of oxygen ($O_2$) in the exhaust gas, and increases a fuel injection amount in a case there is still oxygen content left to be combusted further]. Furthermore, it is conceivable that the purification performance of the automobile exhaust gas can be improved.

From a viewpoint of promoting reactions of the above formulas (1) and (2), the smaller the particle size of the tourmaline fine powder is, the larger specific surface area it has, which is preferable. However, as it requires time and effort and cost to finely crush it, it is practically preferable that maximum particle size is 600 μm.

<Porous Material Fine Powder>

The first feature of the exhaust gas purifying agent for automobiles of the present invention is that the tourmaline fine powder and the porous material fine powder are contained therein.

The tourmaline fine powder adheres and fixes to the air filter and acts so as to decompose moisture (water vapor) in the air passing through the air filter into the hydroxyl ion ($H_3O^{2-}$) and hydrogen gas ($H_2$). When porous material fine powder is added to the exhaust gas purifying agent for automobiles, the porous material fine powder holds, surrounds or supports the tourmaline fine powder to spread a contact area between the tourmaline fine powder and the moisture (water vapor), thereby, the electrolysis effect as above can be promoted.

The porous material may be any of a microporous material (pore size: 2 nm or less), mesoporous material (pore size: 2 to 50 nm) and macroporous material (pore size: 50 nm or more). Examples of the microporous material include activated carbon, zeolite, acetylene black, Ketjen black, furnace black, porous urethane foam, porous polyethylene, porous vinyl acetate and the like. Examples of the mesoporous material include silica oligomer, hollow silica, MCM, FSM and metal oxide nanoparticles. Examples of the macroporous material include pumice and the like.

As a particle size of the porous material fine powder, one having a particle size capable of promoting the electrolysis action of the tourmaline fine powder as above can be used. It is usually preferable to use the one having a primary particle size of 100 nm to 200 nm.

<Fucoidan Extracted from Seaweeds and Amino Peptides and/or Alginic Acids Extracted from Seaweeds>

The second feature of the exhaust gas purifying agent for automobiles of the present invention is that fucoidan extracted from seaweeds and amino peptides and/or alginic acids extracted from seaweeds are contained as components for adhering and fixing the tourmaline fine powder and the porous material fine powder to the air filter.

In order to uniformly adhere the tourmaline fine powder and the porous material fine powder to the air filter by spraying the exhaust gas purifying agent for automobiles to the air filter of the automobile, it is necessary to increase the viscosity of the exhaust gas purifying agent for automobiles. However, if the viscosity is too high, spraying becomes difficult. Furthermore, if the tourmaline fine powder and the porous material fine powder adhered to the air filter are not securely fixed to the air filter after the spraying, the tourmaline fine powder and the porous material fine powder will fall off and scatter due to the air current passing through the air filter.

Therefore, in the exhaust gas purifying agent for automobiles of the present invention,
the fucoidan extracted from seaweeds is added so that the tourmaline fine powder and the porous material fine powder are uniformly adhered to the air filter, and
the amino peptides and/or alginic acids extracted from seaweeds are added so that the amino peptides and/or alginic acids turn into a gel or get thickened due to a heat added during driving the automobile after the air filter is returned to the engine room, and fix the tourmaline fine power and the porous material fine powder to the air filter securely.

As a result, the tourmaline fine powder and the porous material fine powder can be uniformly adhered and securely fixed to the air filter, therefore, it is possible to improve the above-described fuel mileage improving performance and the exhaust gas purification performance, and to extend the effective duration of the exhaust gas purifying agent for automobiles.

The fucoidan extracted from seaweeds is a kind of sulfated polysaccharide which is sometimes expressed as a sticky component of seaweeds, and is a compound in which tens to hundreds of thousands of L-fucose (polysaccharide) are linked by α1-2, α1-4 bonds, and the average molecular weight is about 200,000.

Amino peptides extracted from seaweeds are those in which generally less than 50 amino acids in which an amino group (—NH$_2$) and a carboxyl group (—COOH) are bonded to both sides centering on carbon (C) are bonded to each other.

Alginic acids extracted from seaweeds are polysaccharides contained in seaweeds as shown by the following formula (3), which is a type of dietary fiber.

[Chemical Formula 1]

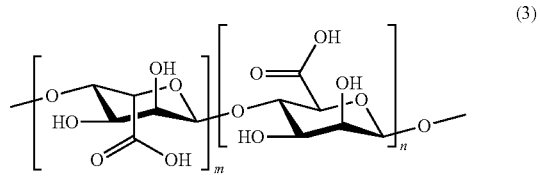

(3)

Incidentally, the fuel mileage improving liquid for automobiles of Patent Document 5 discloses "amino peptides and alginic acids extracted by boiling fish and shellfish and seaweeds with water immersing tourmaline, black silica, or green glitter". However, it is unclear in what way "the tourmaline and the like are contained in "water immersing tourmaline, black silica, or green glitter". Since amino peptides and alginic acids are gelled and thickened when heated, there is concern that the viscosity of the fuel mileage improving liquid for automobiles increases to such an extent that it is not suitable for spraying.

<Plant Essential Oils Such as Cypress Oil and Hiba Oil>

In order to prevent deterioration or decay, it is preferable that the plant essential oils such as cypress oil, hiba oil and the like which act as a natural preservative are contained in the exhaust gas purifying agent for automobiles of the present invention.

Examples of the plant essential oils include juniper oil, lemongrass oil, hiba oil, cassia oil, pimento oil, ylang ylang oil, thyme white oil, cypress oil and the like.

In general, all of these essential oils can be obtained by steam distilling the stem, leaves or root stump of natural plants.

From a viewpoint of price, no solidification at a room temperature, and less coloration, it is preferable to use cypress oil as a plant essential oil.

<Method for Producing Exhaust Gas Purifying Agent for Automobiles>

Next, a method for producing the exhaust gas purifying agent for automobiles of the present invention will be described. As described above, in the exhaust gas purifying agent for automobiles of the present invention, a) tourmaline fine powder, b) porous material fine powder, c) fucoidan extracted from seaweeds, d) amino peptides and/or alginic acids extracted from seaweeds, and preferably e) plant essential oils such as cypress oil, hiba oil and the like are contained in water. Any method can be used as long as these components can be dispersed in water.

Preferably, a) tourmaline fine powder and b) porous material fine powder, which need to be strongly stirred to be suspended/dispersed in water, are dispersed first and then c) fucoidan extracted from seaweeds, d) amino peptides and/or alginic acids extracted from seaweeds, and preferably e) plant essential oils such as cypress oil, hiba oil, and the like are added.

During mixing these components a) to d) and preferably e), as mentioned above, component d) turns into a gel and is thickened due to a heat, therefore, it is preferable that stirring and mixing is carried out at a room temperature in order to prevent this. When the temperature of the solution rises depending on the season, site environment, stirring or the like, it is preferable to cool down the stirring tank appropriately.

<Method of Using the Exhaust Gas Purifying Agent for Automobiles>

Next, a method of using the exhaust gas purifying agent for automobiles of the present invention will be described.

The method of using the exhaust gas purifying agent for automobiles of the present invention is basically carried out by the following steps of:

1) taking out the air filter from the engine room of the automobile, 2) spraying the exhaust gas purifying agent for automobiles on both sides of the air filter, and 3) returning the air filter sprayed with the exhaust gas purifying agent for automobiles to the engine room.

Regarding the spraying amount when spraying on the air filter of an ordinary private car, depending on the concentrations of the components a) to d) and preferably e) and the size and the form of the air filter, 30 cc of the exhaust gas purifying agent for automobiles are sprayed on both sides of the air filter.

The air filter sprayed with the exhaust gas purifying agent for automobiles may be returned to the engine room immediately after the spraying. However, depending on the type of car, there are some cases that a warning is turned on to notify abnormality when returning the air filter in a wet state. Therefore, it is preferable to return it to the engine room after being dried sufficiently.

Embodiment

Hereinafter, the present invention will be described in more detail with a reference to an embodiment, however, the present invention is not limited to the embodiment described below.

<Example of Producing the Exhaust Gas Purifying Agent for Automobiles> a) 0.4 g of tourmaline (maximum particle size: 600 μm)
b) 0.6 g of silica (primary particle size: 100 nm to 200 nm)
c) 1.0 g of fucoidan extracted from seaweeds,
d) 1.5 g of amino peptides and 0.5 g of alginic acids extracted from seaweeds are put in a stirring tank charged with 60 g of ion exchanged water, and mixed uniformly by being stirred at a room temperature for 30 minutes to produce the exhaust gas purifying agent for automobiles.

<Example of Using the Exhaust Gas Purifying Agent for Automobiles>

As shown in FIG. 1, 30 cc of the obtained solution is contained in a spray container 2, the air filter 1 is removed from the engine room of Toyota Mark II (model: E-MCV20W), and the exhaust gas purifying agent for automobiles are sprayed uniformly on both sides of the air filter 1, which is being dried for an hour and returned to the engine room.

<Performance Test of the Exhaust Gas Purifying Agent for Automobiles>

As described above, measurements on "exhaust gas" and "fuel consumption rate" when the fuel mileage improving agent for automobiles is sprayed on the air filter and when the fuel mileage improving agent for automobiles is not sprayed on the air filter were conducted by "Japan Automobile Transport Technology Association by request.

Results of "exhaust gas test" and "fuel consumption rate test" in the ten-fifteen mode running state obtained here are summarized in h FIGS. 2-5.

As shown in the above, when the above fuel mileage improving agent for automobiles is sprayed on the air filter, carbon monoxide (CO) in the exhaust gas is decreased by 30.4%, hydrocarbon (HC) is decreased by 23.3%, nitrogen oxide (NOx) is decreased by 15.09%, and carbon dioxide ($CO_2$) is decreased by 0.43% as compared with the case when it is not sprayed.

Furthermore, the fuel consumption rate (carbon balance method) is also improved from 9.3 km/L to 9.4 km/L.

As also demonstrated in the above embodiment, the exhaust gas purifying agent for automobiles and the method of using the exhaust gas purifying agent of the present invention is an excellent invention which is capable of improving the automobile fuel mileage, and improving the purification performance of the automobile exhaust gas further by substantially reducing the emission amount of nitrogen oxide (NOx) and carbon dioxide ($CO_2$) as well as the emission amount of carbon monoxide (CO) and hydrocarbon (HC) in the exhaust gas with a simple method of spraying the exhaust gas purifying agent for automobiles using only natural ingredients on the air filter. They are further capable of uniformly adhering and securely fixing the tourmaline fine powder and the porous material fine powder to the air filter, thereby extending the effective duration of the exhaust gas purifying agent for automobiles.

In addition, the method of producing the exhaust gas purifying agent for automobiles of the present invention is an excellent invention which is capable of economically and efficiently producing such an excellent automobile exhaust gas purifying agent for automobiles.

The exhaust gas purifying agent for automobiles of the present invention can be applied not only to automobiles but also to other internal combustion engines using outside air of the engine, as is apparent from the principle and effect thereof.

REFERENCE SIGNS LIST

1. Air filter
2. Spray container

The invention claimed is:

1. An exhaust gas purifying agent, comprising an aqueous composition comprising:
    a) a tourmaline fine powder,
    b) a porous material fine powder,
    c) a fucoidan extracted from a seaweed, and
    d) an amino peptide and/or an alginic acid extracted from a seaweed.

2. The exhaust gas purifying agent of claim 1, further comprising:
    e) a plant essential oil.

3. A method of producing the exhaust gas purifying agent of claim 1, the method comprising:
    1) dispersing the tourmaline fine powder and the porous material fine powder in water, to obtain a dispersion, and
    2) adding the fucoidan and the amino peptide and/or the alginic acid to the dispersion.

4. A method of producing the exhaust gas purifying agent of claim 2, the method comprising:
    1) dispersing the tourmaline fine powder and the porous material fine powder in water, to obtain a dispersion, and 2) adding the fucoidan, the amino peptide and/or the alginic acid, and the plant essential oil to the dispersion.

5. The exhaust gas purifying agent of claim 2, wherein the plant essential oil comprises a cypress oil and/or a hiba oil.

\* \* \* \* \*